(12) United States Patent
Kittock et al.

(10) Patent No.: US 6,843,481 B1
(45) Date of Patent: Jan. 18, 2005

(54) FLUID-MOVING DEVICE WITH A CLEARANCE SEAL

(75) Inventors: Mark J. Kittock, Eden Prairie, MN (US); Humayun Qureshi, Eden Prairie, MN (US)

(73) Assignee: Beckman Coulter, Inc., Fullerton, CA (US)

( * ) Notice: Subject to any disclaimer, the term of this patent is extended or adjusted under 35 U.S.C. 154(b) by 30 days.

(21) Appl. No.: 09/685,307

(22) Filed: Oct. 10, 2000

(51) Int. Cl.[7] .............................. F16J 15/44
(52) U.S. Cl. ............................ 277/411; 277/447
(58) Field of Search .................. 277/411, 447, 277/448

(56) References Cited

U.S. PATENT DOCUMENTS

| | | | |
|---|---|---|---|
| 3,282,235 A | | 11/1966 | Crawford |
| 3,348,849 A | | 10/1967 | Newcomb et al. |
| 3,659,862 A | | 5/1972 | Sebastian |
| 3,902,404 A | * | 9/1975 | Breit |
| 3,921,985 A | * | 11/1975 | Fimml |
| 4,392,655 A | * | 7/1983 | Olsen et al. |
| 4,448,424 A | * | 5/1984 | Ernst |
| 4,501,120 A | * | 2/1985 | Holland |
| 4,754,981 A | | 7/1988 | Burns |
| 5,111,736 A | * | 5/1992 | Buchberger et al. ........ 277/585 |
| 5,295,786 A | * | 3/1994 | Kajiwara |
| 5,333,883 A | | 8/1994 | Piper et al. |
| 5,370,402 A | * | 12/1994 | Gardner et al. |
| 5,493,954 A | * | 2/1996 | Kostohris et al. .......... 277/647 |
| 5,667,309 A | * | 9/1997 | Nose |
| 5,738,182 A | | 4/1998 | Birsching et al. |
| 5,772,217 A | | 6/1998 | Poll |
| 5,899,136 A | * | 5/1999 | Tarr et al. |
| 6,070,881 A | * | 6/2000 | Longree |
| 6,206,378 B1 | * | 3/2001 | Sakata et al. |

FOREIGN PATENT DOCUMENTS

| | | |
|---|---|---|
| DE | 199 03 425 A 1 | 1/1999 |
| WO | WO 00/45052 | 8/2000 |

* cited by examiner

*Primary Examiner*—Alison K. Pickard
(74) *Attorney, Agent, or Firm*—William H. May; D. David Hill; Hogan & Hartson, LLP

(57) ABSTRACT

A clearance seal assembly is disclosed. The assembly comprises a stationary member defining a first side, a second side and an opening connecting the first and second side; a moving member moveably disposed through the opening; and a sealing member circumferentially disposed between the stationary member and the moving member. The sealing member has a fluid-tight relationship with the stationary member. The sealing member and the moving member define a continuous and uniform gap having a size that allows the fluid to fill the gap but prevents the fluid from flowing through the gap from the first side to the second side of the opening under an operating pressure differential between the first and the second side. In a preferred embodiment, both the sealing member and the moving member are made of a ceramic material. The sealing assembly may also include a static seal disposed between the stationary member and the sealing to allow a variable clearance therebetween while maintaining the fluid-tight relationship between the sealing member and the stationary member. A pump utilizing the sealing assembly of the present invention is also disclosed.

9 Claims, 2 Drawing Sheets

FLUID-MOVING DEVICE WITH A CLEARANCE SEAL

BACKGROUND OF THE INVENTION

1. Area of the Art

The invention relates generally to fluid-tight dynamic seals between a reciprocating member and its housing. More particularly, the invention is directed to fluid-tight dynamic clearance seals and fluid-moving equipment utilizing such seals.

2. Description of the Prior Art

In many types of fluid-moving equipment, such as liquid pumps, slurry pumps, dry mixers, and numerous other devices, a sliding plunger, rod, piston, or another similar member, reciprocally moves inside a stationary bearing. Typically, fluid leakage around the moving member is prevented by utilizing sealing structures. The material of the sealing structure is required to have some resiliency and yet some degree of stiffness which will permit the moving member to slide back and forth through the axial opening of the sealing structure and yet be tight enough to prevent or at least minimize leakage of the liquid around the moving member.

One type of a conventional sealing structure is a mechanical face seal. Typically, the mechanical face seal consists of one seal ring rotating with the driving shaft and one stationary seal ring attached to the surrounding housing. The two seal rings are pressed towards each other by a biasing force which, in this way, prevents liquid from passing between them. For example, U.S. Pat. Nos. 3,282,235; 4,754,981; and 5,772,217 describe a seal with a spring for providing the biasing force. Usually, additional elastomeric components are required to seal each ring from the shaft or housing, correspondingly. Typically, a thin lubricating film is required between the seal surfaces to prevent their damage by dry friction. Nevertheless, with time, wear and vibrations cause the mating faces of the sealing rings to become scored, resulting in leakage of the process fluid. Environments where the process fluid is abrasive or contains a coagulant are particularly damaging to the conventional seals and require their frequent replacement.

A packed stuffing box is another example of a conventional seal for a moving member. This type of seal has been disclosed, for example, in U.S. Pat. Nos. 3,659,862 and 5,333,883. Generally, the packing is sufficiently compressed to limit the passage of fluid through the packing, but not so compressed as to create excess friction between the packing and the moving member. Pressure is generally maintained on the packing by manually tightening a gland on the stuffing box until the point where leakage through the packing is minimized, yet before the point where friction between the packing and the shaft creates overheating of the packing. Such a configuration operates on the principle of controlled leakage to the atmosphere rather than zero leakage. However, this requires frequent adjustment, and over tightening results in excess friction and heat buildup, excessive wear to the packing, and possibly even damage to the moving member. Even when the pressure on the packing is properly regulated, the pressure necessary to minimize the passage of fluid through the packing causes relatively high friction between the packing and the shaft. As a result, the packing wears out quickly and requires a frequent replacement.

Finally, referring to FIG. 1, a combination of an elastomeric O-ring 1 with a spring preloaded polymer seal 2 has been utilized in the past to create a dynamic seal between a moving member, such as a piston 3, and a housing structure. For example, Beckman Instruments (Fullerton, Calif.) uses this arrangement in the Access Immunoassay Analyzer. Typically, the housing structure includes a casing 4 and a piston-supporting bearing 5. The polymer seal 2 prevents the fluid from flowing between the piston 3 and the bearing 5, while the O-ring 1 seals off the housing. A preloading spring 6 forces the polymer seal 2 to squeeze directly on the piston 3 to accomplish the seal, thus resulting in wear of the polymer. The speed of the moving member and the fluid being sealed determines the required frequency of the polymer seal replacement.

Apparently, the sealing structures of prior art do not provide reliable and long-lasting seals between moving members and their housing. The conventional seals undergo a lot of wear during normal operation and have to be replaced frequently. The necessity to replace seals makes prophylactic maintenance of the equipment more laborious and increases its maintenance costs.

SUMMARY OF THE INVENTION

Accordingly, it is an object of the present invention to provide improved seals which avoid the undesirable features of the prior seals. Particularly, it is an object of the present invention to provide seals which have a low wear, may be produced at relatively low costs, and provide superior performance in use. It is a further object of the present invention to provide convenient fluid-moving devices utilizing such seals with relatively low maintenance cost and high reliability.

These and other objects are achieved in a clearance seal assembly of the present invention. The assembly comprises a stationary member defining a first side, a second side and an opening connecting the first and second side; a moving member moveably disposed through the opening; and a sealing member circumferentially disposed between the stationary member and the moving member. The sealing member has a fluid-tight relationship with the stationary member. The sealing member and the moving member define a continuous and uniform gap, having a size that allows the fluid to fill the gap but prevents the fluid from flowing through the gap from the first side to the second side of the opening under an operating pressure differential between the first and the second side. In a preferred embodiment, both the sealing member and the moving member are made of a ceramic material. The sealing assembly may also include a static seal disposed between the stationary member and the sealing member to allow a variable clearance therebetween while maintaining the fluid-tight relationship between the sealing member and the stationary member.

In another aspect, the invention provides a pump utilizing a clearance seal assembly. The pump comprises a housing structure having an internal wall defining a suction chamber for containing a fluid; a piston movably disposed within the chamber; and a sealing member circumferentially disposed between the housing structure and the piston. The sealing member has a fluid-tight relationship with the housing structure. The sealing member and the piston define a continuous and uniform gap. The gap has a size that allows the fluid to fill the gap but prevents the fluid from flowing through the gap from the suction chamber to an outside of the chamber under an operating fluid pressure.

By eliminating a direct contact between the sealing member and the moving member, the present clearance seal assembly alleviates many of the problems associated with the conventional seals discussed above. In particular, the advantages of this approach include a minimal wear of the part, simplified assembly and maintenance, significantly improved reliability, and a decreased maintenance cost. The clearance seal of the present invention may be utilized in any device or system that requires drawing, moving, and dispensing of fluids. The invention may be particularly advantageous for use in high-precision pumps employed in analytical instrumentation. For example, a piston pump with a clearance seal manufactured in accordance with the present invention may be beneficially utilized for sample aspiration and dispensing in the Nexgen Access System (Beckman Instruments, Calif.), disclosed in a U.S. patent application Ser. No. 09/815,088 titled "Method and System for Automated Immunochemistry Analysis," which has been commonly assigned to the assignee of the present invention and relevant parts of which are incorporated by reference herein.

The invention is defined in the appended claims and is described below in its preferred embodiments.

DESCRIPTION OF THE FIGURES

The above-mentioned and other features of this invention and the manner of obtaining them will become more apparent, and will be best understood by reference to the following description, taken in conjunction with the accompanying drawings, in which.

DETAILED DESCRIPTION OF THE PREFERRED EMBODIMENTS

Figure 1:
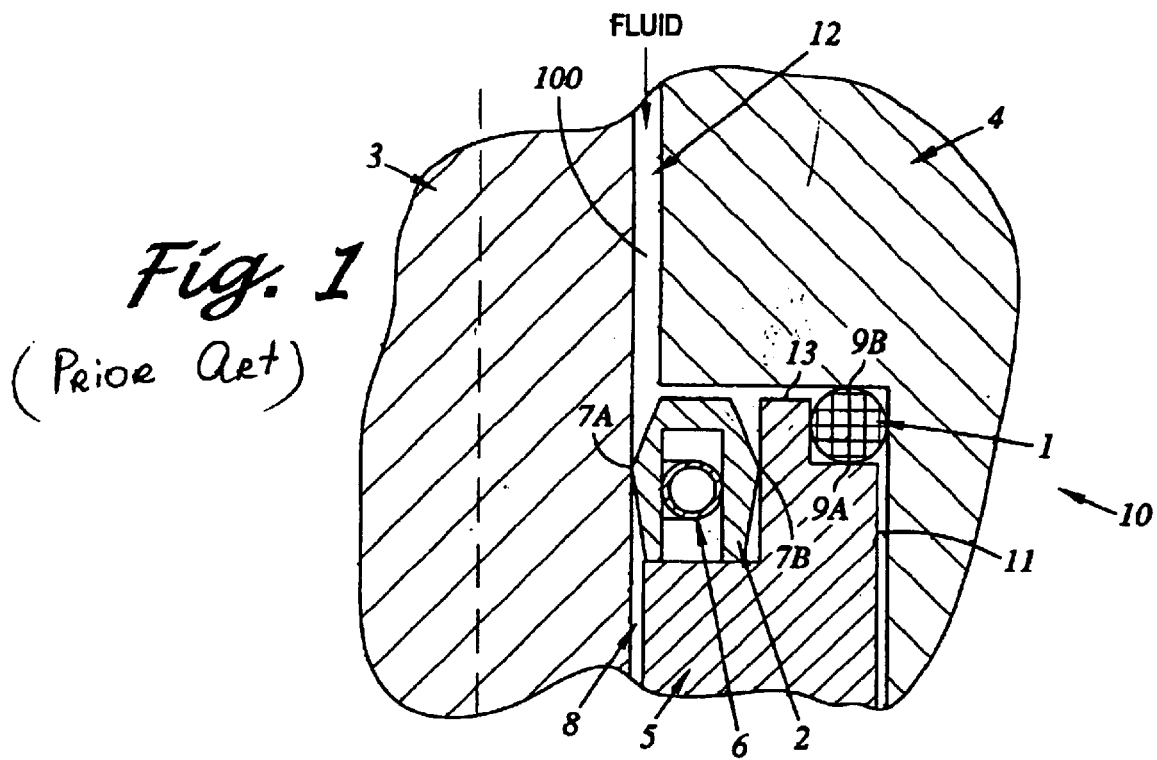
FIG. 1 is a cross-sectional view of a conventional piston seal assembly.

A conventional seal assembly 10 of a piston pump is shown in FIG. 1. Typically, the piston pump includes a housing structure defining a suction chamber 100. The housing structure includes a stationary casing 4 and a stationary piston-supporting bearing 5. A piston 3 reciprocates within the suction chamber and is supported by the bearing 5 circumferentially disposed between the casing and the piston. The conventional seal assembly includes a spring-preloaded polymer seal 2 disposed between the bearing 5 and the piston 3. A preloading spring 6 forces the polymer seal 2 to squeeze on the piston 3 and the bearing 5 to form two sealing points, 7A and 7B, and to prevent a fluid from leaking into a clearance 8 between the piston and bearing. Typically, an additional elastomeric O-ring 1 is placed under a compression between the bearing 5 and the casing 4. The O-ring forms a sealing point 9A with the bearing and a sealing point 9B with the casing to prevent the fluid from running into a clearance 11 between the bearing and the casing. Consequently, the fluid fills the clearances 12 and 13 of the suction chamber 100, but cannot flow into clearances 8 and 11 on the outside of the chamber. However, as discussed above, due to the required contact between the stationary polymer seal 2 and the moving piston 3 at the sealing point 7A, the conventional seal assemblies suffer from rapid deterioration of the polymer seals and require their frequent replacement.

The present invention solves the problems of the prior art by providing a clearance seal, which does not require a direct contact between the piston and the sealing member. The clearance seal assembly of the present invention may be used in an association with any device having a stationary member with an opening and a moving member reciprocating through the opening. Examples of such devices include, but are not limited to, dispensing pumps, slurry pumps, and impeller pumps, used in a broad range of applications. The moving member may be, for example, a sliding plunger, rod, or piston. While a particular configuration of the invention may take on different or modified forms, a piston pump will be used to illustrate the invention in more detail.

Figure 2:
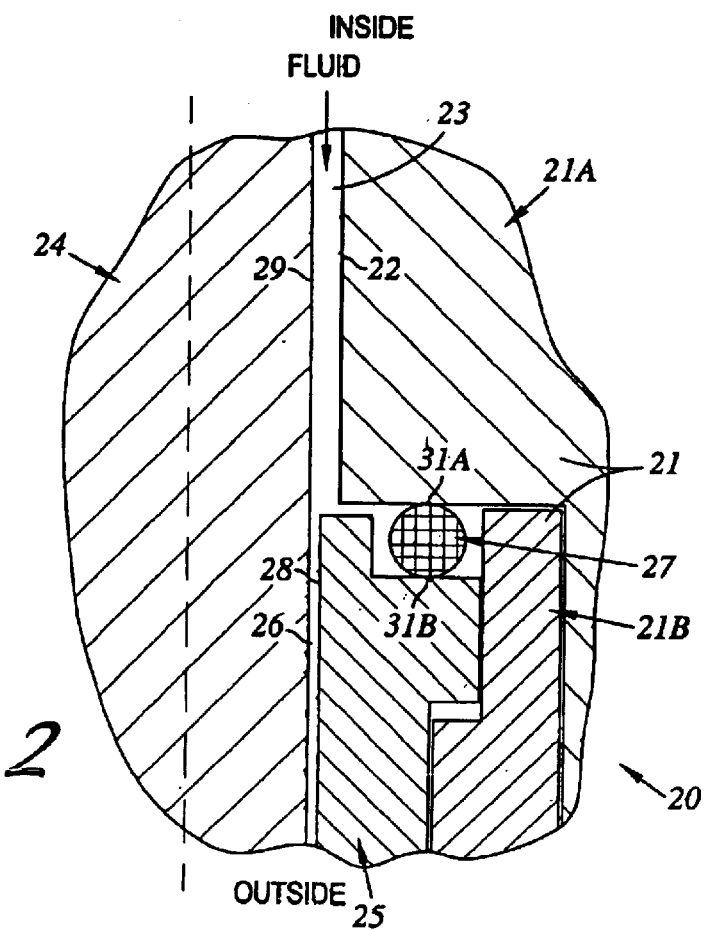
FIG. 2 is a cross-sectional view of a clearance seal, according to one embodiment of the present invention.

Referring to FIG. 2, a piston pump with a clearance seal assembly 20 of the present invention includes a stationary housing structure 21 with an internal wall 22 defining a suction chamber 23 for containing a fluid being pumped. A piston 24 is movably disposed within the suction chamber. A sealing member 25 is circumferentially disposed between the housing structure 21 and the piston 24 and has a fluid-tight relationship with the housing structure. The sealing member and the piston define a continuous and uniform gap 26. The gap 26 has a size that allows the fluid to fill the gap but prevents the fluid from flowing through the gap from the suction chamber to an outside of the chamber under an operating fluid pressure.

Figure 3:
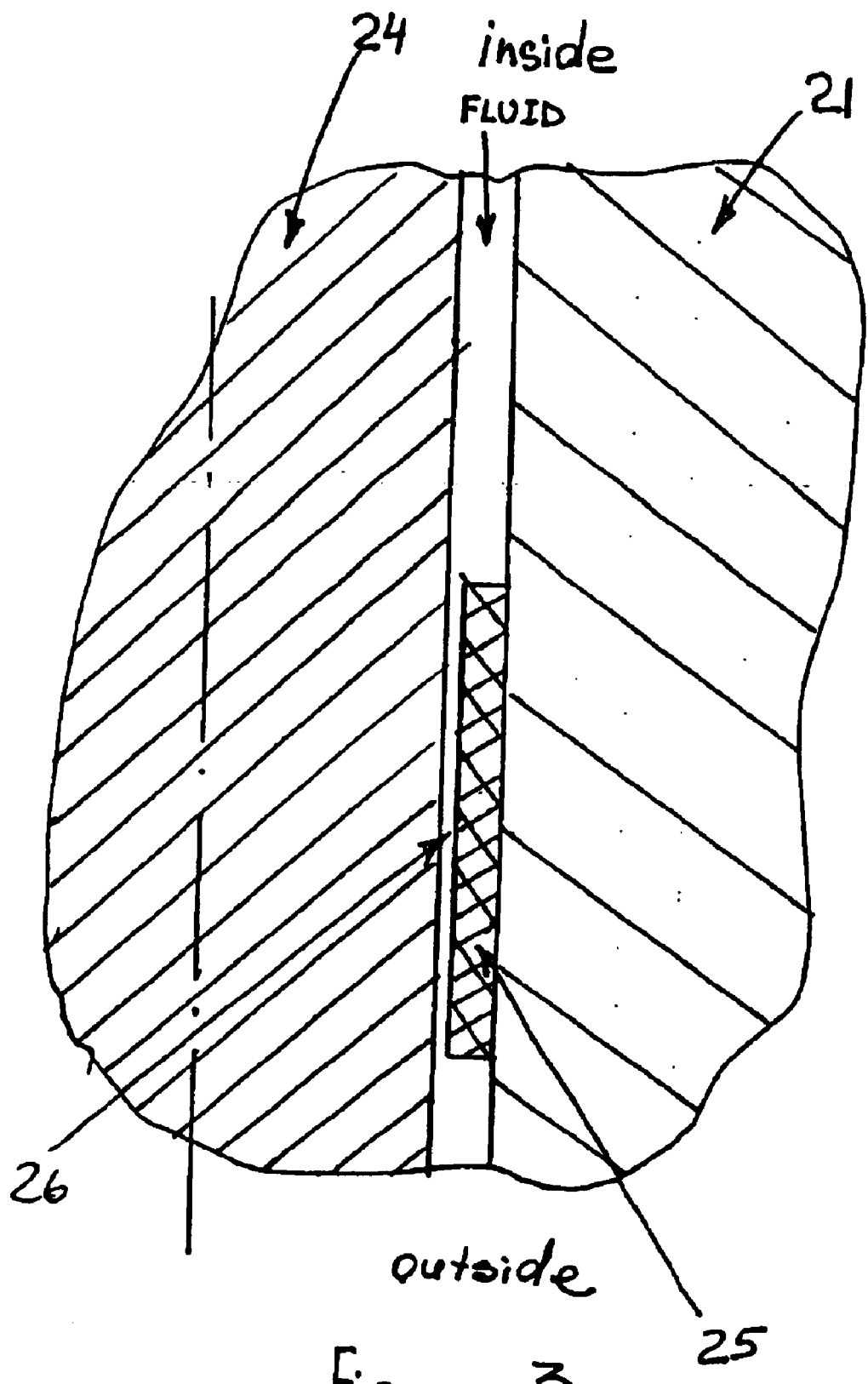
FIG. 3 is a cross-sectional view of a clearance seal, according to another embodiment of the present invention.

In this specification, "a fluid-tight relationship" between two structural elements means that the fluid cannot pass therebetween. It would be appreciated by those skilled in the art that any sealing method between the sealing member 25 and the housing structure 21 may be used, as long as it provides a reliable seal. For example, in one embodiment shown in FIG. 2, a fluid-tight relationship between the sealing member 25 and the housing structure 21 is accomplished by utilizing a removable elastomeric seal, such as an O-ring 27. In another embodiment shown in FIG. 3, the sealing member 25 is integrally formed with the housing structure 21. In this embodiment, the sealing member may be molded together with the housing from the same material. Alternatively, the sealing structure may be made of a different material than the housing structure and attached to the housing. Means and methods of attachment of two members are well-known in the art and will not be discussed.

Referring to FIG. 2, in this specification, a "continuous gap" means that the sealing member and the piston do not have any points of direct contact. A "uniform gap" means that the distance between the piston and an internal wall 28 of the sealing member does not vary significantly so as to compromise the hydraulic seal formed therebetween. It would be appreciated by those skilled in the art, that such a uniform gap requires closely controlled radial dimensions of an outer wall 29 of the piston and the internal wall 28 of the sealing member and a high assembling precision. Consequently, to simplify the control of the critical gap 26, in the preferred embodiment, the cross-sections of the internal and the outer walls 28 and 29 have substantially circular shapes. Materials that have a high hardness and can be machined with a great precision may be used to make the sealing member and the piston and would be known to those of ordinary skill in the art in view of this disclosure. In one embodiment, both the sealing member and the piston are made of ceramic materials.

It is an unexpected discovery by the present inventors that a fluid seal can be formed between a moving and a stationary member without a direct contact therebetween. It has been observed that the size of the gap 26 may be selected to allow the fluid to fill the gap between the seal and piston, thus avoiding a dry friction, but to prevent the fluid from flowing through the gap. It may be hypothesized, that when the clearance gap is sufficiently small, the adhesive forces of the fluid toward the piston and the seal are greater than the force exerted by the fluid due to an operating pressure, thus preventing the fluid from flowing through the gap.

The ranges of suitable sizes of the gap 26 depend on the physical properties of the fluid being pumped, such as viscosity, surface tension, adhesive force, and operating pressure. Low viscosity fluids will typically require a smaller gap 26 than higher viscosity fluids. Generally, the higher viscosity of a fluid, the broader range of the gaps 26 may be used. It should be recognized that the size of the gap greatly depends on a type of application. Those skilled in the art can easily select the size of the gap to accommodate fluids and operating pressures used in a particular application without undue experimentation in view of the instant disclosure.

The housing structure 21 of the pump of the present invention may include a casing 21A defining the suction chamber 23 for accommodating the piston 24, and a bearing 21B, circumferentially disposed between the piston and the casing to support the piston. A static seal 27 may be further disposed between the casing and the sealing member to provide a fluid-tight relationship between the casing and the sealing member. Preferably, the static seal member is an annular elastomeric seal removably mounted under compression, forming a sealing point 31A with the casing and a sealing point 31B with the sealing member. Comparing FIGS. 1 and 2, it is apparent that the sealing assembly of the present invention is more reliable as it has fewer contact sealing points, which are potential sources of fluid leaks. Referring to FIG. 2, it should be understood that a precise position of the static seal 27 is not important, as long as it prevents fluid from flowing between the housing structure and the sealing member.

Although the invention is described with a particular reference to a piston pump, it should be recognized that the general features of the clearance seal may be utilized in any device having a stationary member, such as the housing structure 21, with an opening, such as suction chamber 23, and a moving member, such as piston 24, moveably disposed through the opening. Generally speaking, the stationary member may have any shape so long as it defines two volumes, such as inside and outside of the pump, referred to as two sides of the stationary member, and connected by the opening. The two volumes may contain different fluids and/or be under different pressure (e.g. operating fluid pressure inside the pump and atmospheric pressure outside the pump).

The present invention may be embodied in other specific forms without departing from its essential characteristics. The described embodiment is to be considered in all respects only as illustrative and not as restrictive. The scope of the invention is, therefore, indicated by the appended claims rather than by the foregoing description. All changes which come within the meaning and range of the equivalence of the claims are to be embraced within their scope.

What is claimed is:

1. A clearance seal assembly, comprising:
   a stationary member defining a first side, a second sides, an opening connecting the first and second side, and an inner wall surrounding the opening;
   a moving member moveably disposed through the opening; and
   a sealing member having an internal wall and an outer wall, the sealing member circumferentially disposed between the stationary member and the moving member, wherein the inner wall of the stationary member and the outer wall of the sealing member define a first gap and an entry of a liquid into the first gap is blocked by a static seal disposed between the stationery member and the sealing member, wherein the sealing member and the moving member, when assembled, define a continuous and uniform second gap, having a size that allows the fluid to fill the second gap but prevents the fluid from flowing through the second gap from the first side to the second side of the opening under an operating pressure differential between the first and the second side, wherein the size of the second gap remains unchanged from assembly to under operating pressure.

2. The clearance seal assembly of claim 1, wherein the sealing member and the moving member are made of ceramic materials.

3. The clearance seal assembly of claim 1, wherein the second gap is defined by the internal wall of the sealing member and an outer wall of the moving member, and cross-sections of the internal wall of the sealing member and the outer wall of the moving member have substantially circular shapes.

4. A clearance seal assembly comprising:
   a stationary member defining a first side, a second side, an opening connecting the first and second side, and an inner wall surrounding the opening;
   a moving member moveably disposed through the opening; and
   a sealing member having an internal wall and an outer wall, the sealing member circumferentially disposed between the stationary member and the moving member, wherein the sealing member is integrally formed on the inner wall of the stationary member,
   wherein the sealing member and the moving member, when assembled, define a continuous and uniform gap, having a size that allows the fluid to fill the gap but prevents the fluid from flowing through the gap from the first side to the second side of the opening under an operating pressure differential between the first and the second side wherein the size of the gap remains unchanged from assembly to under operating pressure.

5. The clearance seal assembly of claim 1, wherein the static seal is an annular elastomeric seal removably mounted on the sealing member.

6. A pump, comprising:
   a housing structure having an internal wall defining a suction chamber for containing a fluid;
   a piston movably disposed within the chamber; and
   a sealing member having an inner wall and an outer wall, the sealing member circumferentially disposed between the housing structure and the piston, wherein the internal wall of the housing structure and the outer wall of the sealing member define a first gap and an entry of a liquid into the first gap is blocked by a static seal disposed between the housing structure and the sealing member and the sealing member and the piston, when assembled, defining a continuous and uniform second gap, wherein the second gap has a size that allows the fluid to fill the second gap but prevents the fluid from flowing through the second gap from the suction chamber to an outside of the chamber under an operating fluid pressure, wherein the size of the second gap remains unchanged from assembly to under operating pressure.

7. The pump of claim 6, wherein the sealing member and the piston are made of ceramic materials.

8. The pump of claim 6, wherein the housing structure comprises:

a casing defining the suction chamber for accommodating the piston, and a bearing circumferentially disposed between the piston and the casing.

9. The pump of claim 6, wherein the static seal is an annular elastomeric seal removably mounted on the sealing member.

* * * * *